(12) United States Patent
Buschmann et al.

(10) Patent No.: US 7,806,663 B2
(45) Date of Patent: Oct. 5, 2010

(54) FASTENING ARRANGEMENT OF A PIPE ON A CIRCUMFERENTIAL SURFACE

(75) Inventors: Axel Buschmann, Essen (DE); Markus Kunze, Hünxe (DE); Arnd Reichert, Orlando, FL (US)

(73) Assignee: Siemens Aktiengesellschaft, Munich (DE)

( * ) Notice: Subject to any disclaimer, the term of this patent is extended or adjusted under 35 U.S.C. 154(b) by 1002 days.

(21) Appl. No.: 11/594,588

(22) Filed: Nov. 7, 2006

(65) Prior Publication Data

US 2007/0108762 A1     May 17, 2007

(30) Foreign Application Priority Data

Nov. 8, 2005    (EP) .................................. 05024337

(51) Int. Cl.
| | |
|---|---|
| *B63H 1/28* | (2006.01) |
| *B63H 5/00* | (2006.01) |
| *B63H 7/00* | (2006.01) |
| *B63H 13/00* | (2006.01) |
| *B63H 15/00* | (2006.01) |
| *B64C 11/14* | (2006.01) |
| *B64C 27/32* | (2006.01) |
| *F01D 5/00* | (2006.01) |
| *F01D 25/00* | (2006.01) |
| *F03B 1/02* | (2006.01) |
| *F03B 11/00* | (2006.01) |
| *F03D 11/00* | (2006.01) |
| *F04D 29/00* | (2006.01) |

(52) U.S. Cl. ............... 416/244 A; 285/331; 416/198 A; 415/216.1

(58) Field of Classification Search ............. 416/198 A, 416/244 A; 285/331; 415/216.1
See application file for complete search history.

(56) References Cited

U.S. PATENT DOCUMENTS 6,053,697 A * 4/2000 Piekarski et al. ............ 415/115
7,182,579 B2 * 2/2007 Roso et al. ............... 416/204 A

FOREIGN PATENT DOCUMENTS

| DE | 100 13 468 C1 | 5/2001 |
|---|---|---|
| EP | 1 087 101 A2 | 3/2001 |

* cited by examiner

*Primary Examiner*—Michael Cuff
*Assistant Examiner*—Craig Kim

(57) ABSTRACT

The invention relates to a fastening arrangement of a pipe, which is coaxial to a longitudinal axis, on a shaft step, which is rotatably mounted around the longitudinal axis, for connecting of the two component parts, with a coaxial circumferential surface located on the shaft step, upon which circumferential surface at least partially lies the inner side of the pipe end which faces the shaft step. In order to disclose the creation of a fastening arrangement which is especially simple and inexpensive to manufacture and also free of wear during operation, it is proposed that the pipe end has notches distributed over the circumference, and an encompassing annular slot on the inner side of the pipe in the region of the notches, with a sleeve which is installed in the annular slot, covers the notches, and at least partially lies on the circumferential surface of the shaft step.

9 Claims, 3 Drawing Sheets

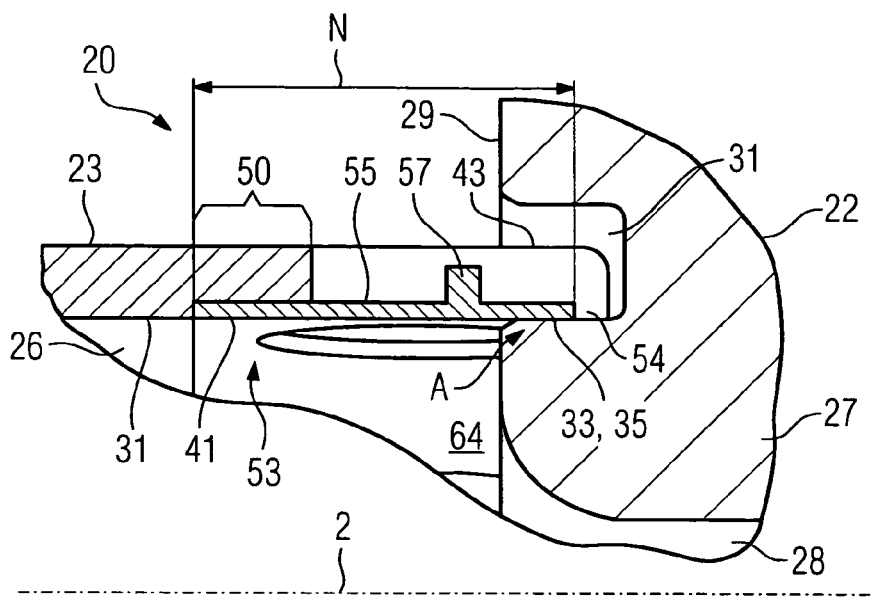
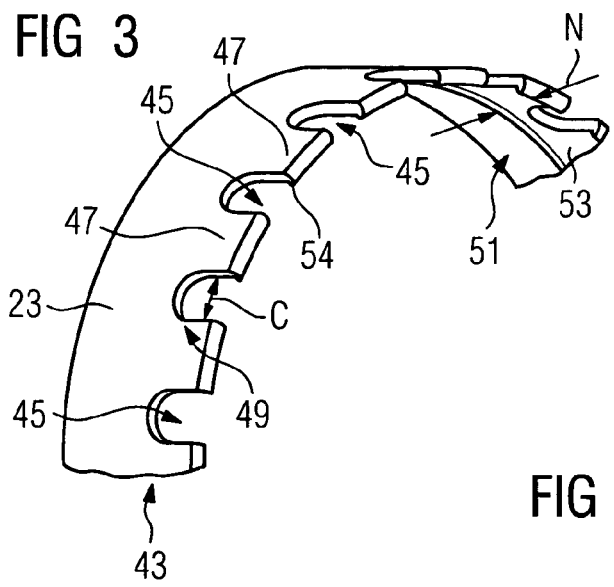
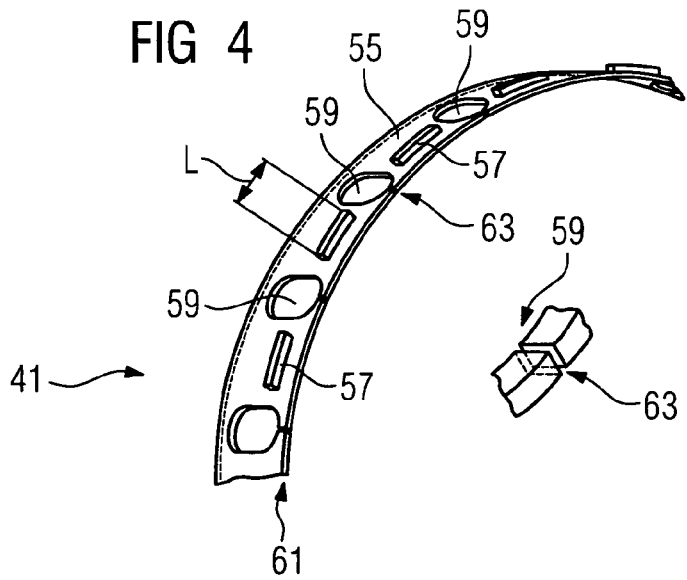

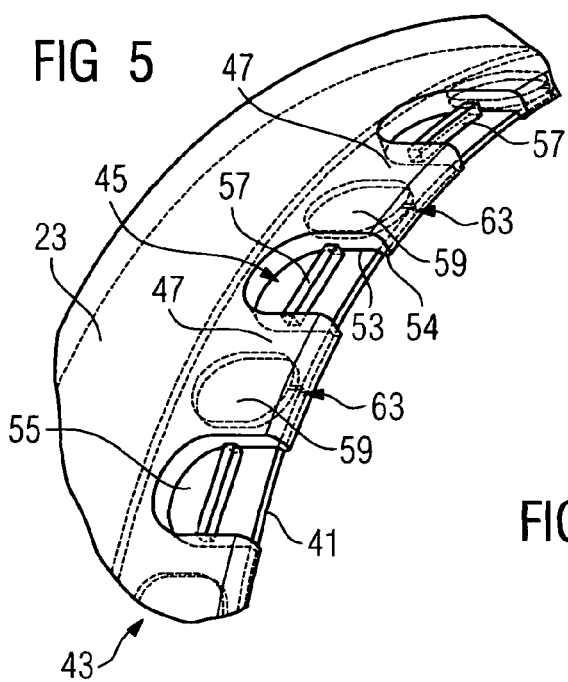
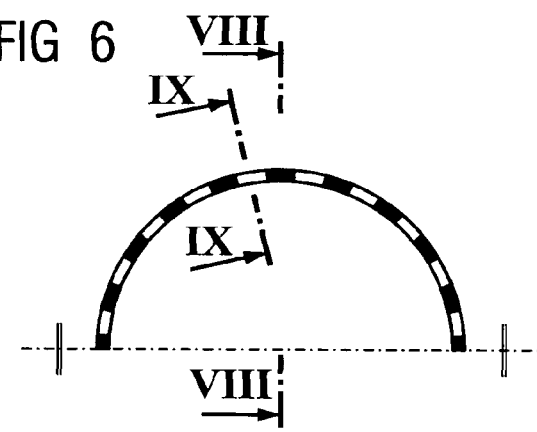
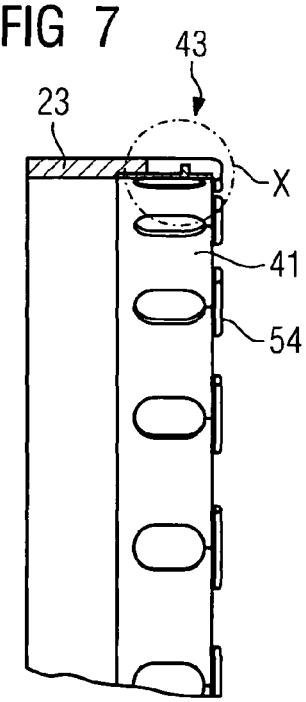
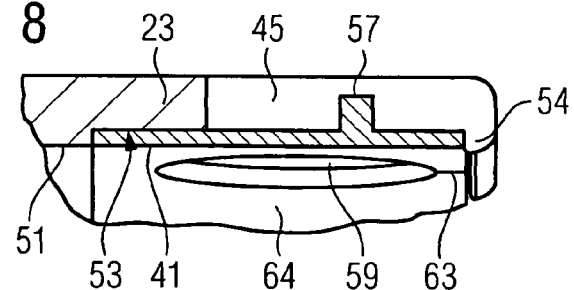
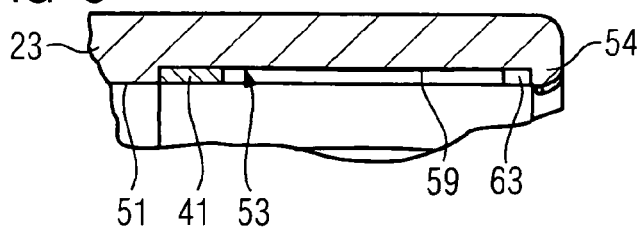

FASTENING ARRANGEMENT OF A PIPE ON A CIRCUMFERENTIAL SURFACE

CROSS REFERENCE TO RELATED APPLICATIONS

This application claims the benefits of European Patent application No. 05024337.7 filed Nov. 8, 2005. All of the applications are incorporated by reference herein in their entirety.

FIELD OF INVENTION

The invention relates to a fastening arrangement of a pipe, which is coaxial to a longitudinal axis, on a circumferential surface of a shaft step, which is coaxial to the longitudinal axis, for connecting of the two components.

BACKGROUND OF THE INVENTION

For power generation, stationary gas turbines are known, the rotors of which are assembled from abutting compressor disks and turbine disks. These rotor disks are clamped to each other by a central tie bolt and on their periphery carry rotor blades, which in the compressor are for compressing of ambient air, and which in the turbine are for conversion of electrical energy into mechanical energy by the expansion of a hot gas which is produced by the combustion of fuel with the compressed air. In order to protect the component parts of the turbine against the temperatures of the hot gas, these are actively cooled, for example by means of cooling air. For example, the rotor blades of the turbine are cooled by compressed air. Some of the air required for this is extracted from the compressor on the rotor side and guided into the inside of the rotor. The rotor disks have central holes by which the extracted air can flow through the rotor in the axial direction. Since the combustion chamber is located between the compressor and the turbine of the gas turbine on the casing side, the rotor in this axial section has a pipe which is coaxial to the longitudinal axis, for transmission of the extracted air, which pipe is supported between the oppositely disposed end faces of the last rotor disk of the compressor and the first rotor disk of the turbine. For this purpose, it is known that the two rotor disks have an annular slot located in the end face, in which engages the pipe for guiding of the cooling air. The cooling air separation pipe is provided with a special shrink fit so that it has an antirotation or antislip seat on the rotor disk, as the case may be.

Despite the shrink fit, operation-induced displacements or slips, as the case may be, of the cooling air separation pipe in relation to the rotor disk can happen, which occurs on account of the different thermally-induced expansion of the two component parts, especially during starting (cold start) and during shutting down of the gas turbine. These displacements can lead to a permanent plastic deformation of the pipe end in the comparatively thin-walled cooling air separation pipe. Different operating modes also lead to such wear so that leaks in the connection between the cooling air separation pipe and the rotor disk can occur. The leaks lead to losses and leakages in the cooling air flow, as a result of which the efficiency of the gas turbine reduces.

Furthermore, the manufacture of the shrink fit, by which the cooling air separation pipe bears under a pretensioning upon a supporting surface of the turbine disk, is costly, since the fabrication of the shrink fit requires a tolerance range of a few hundredths of a millimeter.

SUMMARY OF INVENTION

Accordingly, the object of the invention is the creation of a fastening arrangement of a pipe on a circumferential surface of a shaft step, which fastening arrangement is to be manufactured especially simply and inexpensively, and, moreover, which is to be free of wear during operation.

To solve this problem according to the invention, a fastening arrangement of this generic type is disclosed, in which the inner side of the pipe end which faces the shaft step lies against a circumferential surface which is coaxially located on the shaft step, wherein the pipe end has notches, which are distributed over the circumference, and on the inner side of the pipe in the region of the notches the pipe end has an encompassing annular slot within which is installed a sleeve which covers the notches, the inner face of which lies along the circumferential surface.

According to the invention, the requirements for the fastening arrangement with regard to the mechanical load and sealing integrity are met by a functional separation from each other. The predetermined rigidity or elasticity, as the case may be, which is required for the wear-free seat of the pipe on the circumferential surface, is established by the shape, number and dimensions of the notches which are provided on the pipe end, and also by the shape, number and dimensions of the teeth which remain as a result of these and which lie against the circumferential surface. Consequently, the operation-induced displacements between the rotor disk and the pipe achieve the effect of creating in the pipe only material stresses which cause elastic deformations, but no plastic deformations, of the end. The teeth lie upon the circumferential surface with spring elastic effect. The leakiness which is caused by the notches is sealed by the sleeve which covers all the notches. The sleeve is installed inside the pipe in an annular slot and lies in two respectively encompassing sealing areas which are separated from each other; on the circumferential surface of the shaft step on the one hand, and on the inner side of the annular slot on the other hand.

The invention is also based on the knowledge that for pure sealing of the transition from the pipe to the shaft step a lesser rigidity is required than for the wear-free fastening of the pipe. On account of the different rigidity of the sleeve and the pipe end, which is dentiform as a result of the notches, an especially simple fastening arrangement of a pipe which is coaxial to a longitudinal axis, on a shaft step which is rotatably mounted through the longitudinal axis, can be disclosed for connecting of the two component parts, which despite its inexpensive and simple manufacture is especially free of wear. The pipe is simple and cost effective to manufacture since it provides a circular seat.

An essential feature of the invention, therefore, is the separation of the elastic seat of the pipe on the shaft step, and the sealing of the connection of the two component parts by the sleeve.

Since the sleeve covers the notches, this leads to a sealed connection between pipe and shaft step so that a medium is reliably guidable inside the pipe without operation-induced leakages or losses of medium, as the case may be, occurring by an unsealed connecting region of the two component parts.

The selection of material for the pipe and the sleeve is made on the basis of the thermal expansions and the wear behavior which are demanded at the desired position.

Furthermore, the moving of the sleeve relatively to the pipe is avoided. The annular slot, which is incorporated on the inner side of the pipe, forms on each tooth of the pipe end on the end side a projection upon which the sleeve immovably lies by its end face. Thus, all the component parts maintain their position in relation to each other without an operation-induced and wear-affected wedging in relation to each other occurring.

Advantageous developments of the invention are disclosed in the dependent claims.

In order to achieve an especially reliable connection of the two component parts, the sleeve has a wall thickness which corresponds to the depth of the annular slot. As a result of this, it is possible for the sleeve to lie extensively on the circumferential surface of the shaft step and on the inner side of the annular slot, so that on the one hand the pipe end lies on the shaft step with the necessary rigidity and elasticity for its bearing and fastening, and the sleeve also lies tightly against the circumferential surface with the necessary rigidity or elasticity, as the case may be, for sealing.

In a development of the sleeve, the latter has at least one bar, located on the outer circumferential side of the sleeve, extending in the circumferential direction, and engaging in one of the notches in the installed state, which bar extends over the whole width of the notch. The rotation of the sleeve in relation to the pipe, therefore, is prevented by the bar lying upon the teeth on both sides.

The rotation of the sleeve in relation to the pipe can be prevented especially reliably and in a wear-free manner if in each notch a bar, which is located on the outer circumferential side of the sleeve, engages in these in each case.

An especially advantageous weight of the sleeve can be achieved if the sleeve has a plurality of radially orientated cutouts which are distributed over the circumference, which, if necessary, are provided in each case between the bars which are similarly distributed over the circumference. The cutouts reduce the weight of the sleeve and make these more flexible than the pipe. In addition, the sleeve has one end which faces the shaft step with slots extending parallel to the longitudinal axis, which terminate in one of the cutouts in each case. These slots, which are about 1 mm wide, lead to a further improved elasticity of the sleeve. Since each tooth and each projection which is located upon it lies tightly along the slot opening, no leakages between sleeve, projection and circumferential surface occur at these points of the seal. Thus, medium which is guided inside the pipe cannot leak out.

The fastening arrangement according to the invention can be advantageously used if the shaft step has an end face side surface in which is provided an annular slot which is concentric to the longitudinal axis, the radially inner slot wall of which forms the coaxial circumferential surface for the location of the pipe. The pipe end then engages in the annular slot by its teeth which are formed by the notches.

Expediently, the shaft step is formed by a rotor disk, or the end face side surface of the shaft step is the side surface of a rotor disk, as the case may be. Since the shaft step or the rotor disk, as the case may be, have especially large masses, these have a temporally different expansion behavior in relation to the pipe and its end on account of different mass aggregates. That makes it necessary to position and fasten the pipe end according to the invention in the rotor disk with tolerance for expansion.

A rotor for a turbo-engine with a pipe and a shaft step, which are interconnected by a fastening arrangement according to the invention, has an especially long service life, likewise a gas turbine which is equipped with such a rotor. Furthermore, as a result of the reliable and sealed seat, losses of medium which flows inside the pipe, for example cooling air, are avoided, which maintains the efficiency of the gas turbine.

In order to optimally establish the elasticity of the sleeve which is required for a wear-free seat of the pipe on the shaft step and for the sealing, the thickness ratio of pipe wall to sleeve wall is about 3:1.

BRIEF DESCRIPTION OF THE DRAWINGS

The further explanation of the invention follows with reference to the exemplary embodiments illustrated in the drawing.

In the drawings, in detail:

FIG. 2 shows a fastening arrangement of a pipe on a shaft step, in a sectional view, FIG. 3 shows a detail of the pipe end which is fastenable on the shaft step, in perspective view, FIG. 4 shows a section of a sleeve as part of the fastening arrangement, in perspective view, FIG. 5 shows in perspective view a detail of the pipe end with sleeve fitted on the inner side of the pipe, FIG. 6 the end face view of the pipe according to FIG. 5, FIG. 7 shows the cross section of the pipe end with sleeve fitted, FIG. 8 shows detail X according to FIG. 7 in the sectional view VIII according to FIG. 6 and FIG. 9 shows detail X according to FIG. 7 in the sectional view IX according to FIG. 6.

DETAILED DESCRIPTION OF INVENTION

Figure 1:
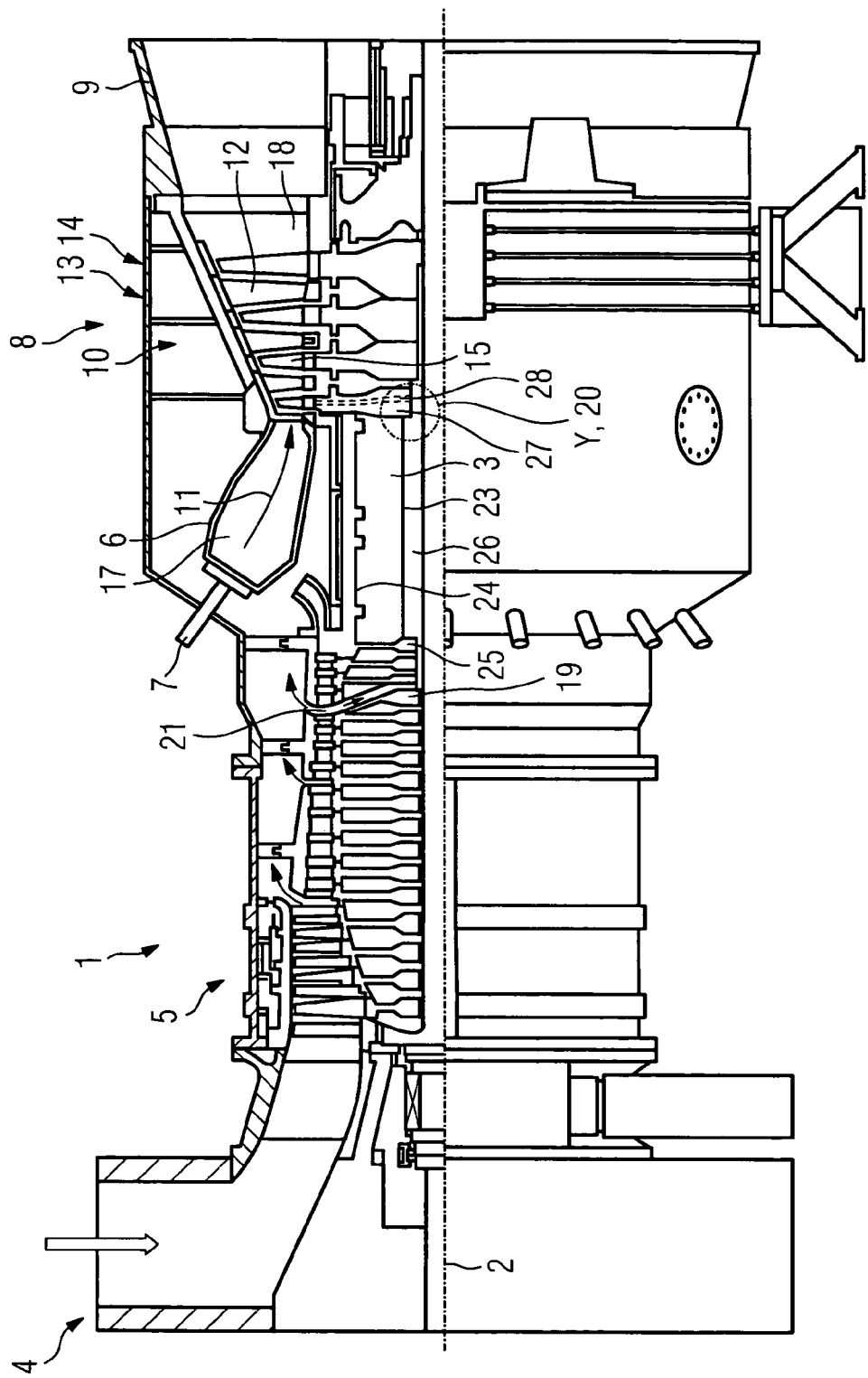
FIG. 1 shows a gas turbine in a longitudinal partial section.

FIG. 1 shows a gas turbine 1 in a longitudinal partial section. On the inside it has a rotor 3, which is also designated as a turbine rotor, which is rotatably mounted around a rotational axis 2. In series along the rotor 3 there is an intake casing 4, a compressor 5, a toroidal annular combustion chamber 6 with a plurality of burners 7 arranged axially symmetrically in relation to each other, a turbine unit 8, and an exhaust casing 9. The annular combustion chamber 6 forms a combustion space 17 which communicates with an annular hot gas passage 18. There, four turbine stages 10 connected one behind the other form the turbine unit 8. Each turbine stage 10 is formed from two blade rings. Viewed in the flow direction of a hot gas 11 which is produced in the annular combustion chamber 6, a row 14 formed from rotor blades 15 follows a stator blades row 13 in the hot gas passage 18 in each case. The stator blades 12 are fastened on the stator, whereas the rotor blades 15 of a row 14 are attached on the rotor 3 by means of a turbine disk. A generator or a working machine (not shown) is coupled to the rotor 3.

For cooling of the rotor blades 15 of the turbine unit 8, cooling air is extracted from the compressor 5 on the rotor side at the cooling air bleed point 21 and guided into the inside of the rotor 3. The air which is extracted and provided for cooling of component parts of the turbine flows from the cooling air bleed point 21 first through holes which are provided in the rotor disks 19, and then enter the cavity 26 of a pipe 23. The pipe 23 extends from the rotor disk 25 of the compressor 5 as far as the rotor disk 27 of the first turbine stage coaxially. to the longitudinal axis 2. From there, the cooling air is guided through partially shown holes 28 located in the rotor disk 27 towards the rotor blades 15 of the turbine unit 8. The torque of the rotor 3 is transmitted by a hollow shaft 24, which encompasses the pipe 23, from the rotor disk 27 on the turbine side to the rotor disk 25 on the compressor side.

FIG. 2 shows in detail the fastening arrangement 20 of the co-axial pipe 23 on a shaft step which is rotatably mounted around the longitudinal axis 2, as applied in detail Y of FIG. 1, for example. The end of the pipe 23, which engages in the rotor disk 25 of the compressor 5, can be designed additionally or alternatively according to the fastening arrangement 20.

FIG. 2 shows, in cross sectional view, detail Y of FIG. 1 with the pipe 23 and also the rotor disk 27. The rotor disk 27 on its end face 29 has an annular slot 31 which endlessly extends concentrically to the longitudinal axis 2. The radially inner slot wall 33 of the annular slot 31 forms the coaxial circumferential surface 35 upon which lies the pipe 23. Instead of an annular slot 31, the pipe 23 could also lie upon the outermost circumferential surface of a shaft step 22 or a shaft collar.

A sleeve 41 is provided inside the pipe 23, which sleeve by its inner side 64 also lies along the circumferential surface 35 or on the radially inner slot wall 33 of the annular slot 31, as the case may be, and so forms a first coaxially encompassing sealing area A between sleeve 41 and circumferential surface 35. The thickness ratio of pipe wall to sleeve wall is about 3:1.

FIG. 3 shows in perspective view the end 43 of the pipe 23 which is inserted in the annular slot 31 and fastened in the latter under a preferably small pretension. Notches 45 are provided on the pipe end 43, being distributed evenly over its circumference, which form teeth 47 which lie in between. The notches 45 are rounded on their end 49 furthest from the pipe end 43 in order to avoid notch stresses at this point. The notches 45 which are distributed over the circumference of the pipe 23, and, therefore, also the teeth 47 lying in between, are arranged preferably axially symmetrically. Each notch 45 has a width C in the circumferential direction, which is preferably identical for each notch 45.

On the inner side 51 of the pipe 23, an encompassing annular slot 53 is provided, in which a sleeve 41 can be inserted. The annular slot 53 is slightly spaced away from the end 43 of the pipe 23 so that a projection 54 is formed on each tooth 47 for hooking onto the sleeve 41. Moreover, the annular slot 53 has a slot width N extending in the axial direction of the pipe 23, which corresponds to the longitudinal extent of the sleeve 41 which is fitted with positive locking effect. The slot width N is selected so that the annular slot 53 projects over the rounded end 49 of the notches 45 and so presents an encompassing locating face 50 (FIG. 2) for the sleeve 41, which is at least a part of a second sealing area.

FIG. 4 shows, in perspective view, the sleeve 41 which is insertable in the annular slot 53. The sleeve 41 is equipped with a plurality of bars 57 which are located on the outer circumference 55, the length L of which, which extends in the circumferential direction in each case, corresponds to the width C of the notches 45 in each case. The sleeve 41, moreover, optionally has cutouts 59 located between two bars 57 in each case, the cutouts being distributed over the circumference, which reduce the weight of the sleeve and make this comparatively elastic with regard to the elasticity of the pipe end 43. Furthermore, a slot 63 is optionally provided in each cutout 59 at the end 61 which faces the shaft step 22 in each case, which slot extends basically axially parallel to the longitudinal axis 2 and contributes to the further increase of the elasticity of the sleeve 41.

FIG. 5 shows the pipe end 43 with the sleeve 41 already fitted. On account of the encompassing annular slot 53 on the inner side 51 of the pipe 23, a projection 54 (see FIG. 2) is formed on the outermost end 43 of the pipe 23 on each tooth 47, upon which the sleeve 41 is secured against tilting. Since the teeth 47 enable a radially orientated, spring elastic action, the sleeve 41 can be comparatively simply inserted into the inside of the pipe 23 for assembly. As a result of this, a reliable positioning and fastening of the more elastic sleeve 41 on the inner side 51 of the pipe end 43 is ensured.

As can be seen from FIG. 5, the sleeve 41 and annular slot 53 have an axial width N which is selected so that the inserted sleeve 41 completely covers all the notches 45. In the same way, each tooth 47 completely covers one of the cutouts 59 so that the adjacent faces of the teeth 47 and the sleeve 41 form a further part of the second sealing region.

The depth of the annular slot 53 corresponds basically to the wall thickness of the sleeve 41. As a result of this, it is possible that over the whole circumference the inner side 64 of the sleeve 41 and each projection 54 lie tightly on the circumferential surface 35 or on the radially inner slot wall 33 of the annular slot 31, as the case may be.

FIG. 6 shows a purely end face view of FIG. 5, wherein the sections which are shown dark represent the notches 45 and the sections which are shown light represent the teeth 47.

FIG. 7 shows, in a sectional view, the pipe end 43 with sleeve 41 fitted. The detail X is shown in detail in FIG. 8 and FIG. 9 according to the associated lines of intersection from FIG. 6.

The projection 54 on the inner side 51 of the pipe 23 which remains as a result of the annular slot 53, is shown in FIG. 8. The especially elastic sleeve 41 is introduced into the annular slot 53, the bars 57 of the sleeve which extend in the axial direction securing the sleeve 41 against displacement. The bars 57 are located in the notches 45. On account of the perspective partially sectional view of FIG. 8, one of the cutouts 59 is also shown, which at its ends is open on the end face on account of the slot 63. Although the slot 63, being as a rule 1 mm wide, represents in each case a break in the circumference of the sleeve 41, and, therefore, apparently in the sealing region A, the latter is nevertheless sealed. At this point, the tooth 47, which lies upon the sleeve 41 on the outside, lies tightly on the circumferential surface 35 by the projection 54 located on the end face in each case, and, therefore, forms a further part of the second sealing region in each case.

FIG. 9 shows the section according to IX from FIG. 6 with the pipe 23. On account of the notches 45, the pipe 23, which is otherwise comparatively rigid, is constructed to be more flexible in the region of the pipe end 43, so that, while lying upon a circumferential surface, a wear-resistant seat on the circumferential surface 35 is ensured. This elastic seat enables a both heat-induced and a centrifugal force-induced expansion for the two component parts, being the pipe 23 and also the shaft step 22 or the rotor disk 27, as the case may be, while maintaining a reliable sealing of the connection. Especially on account of the different rigidity or elasticity respectively of the two component parts, and also on account of their fastening which is now free of wear because of expansion tolerances, the invention discloses an especially reliable and durable seat or a corresponding fastening arrangement 20, as the case may be.

In all, a reliable and wear free fastening arrangement is disclosed by the invention, which enables a sealed connection of a pipe, which is constructed as a cooling air separation pipe and which is on a circumferential surface, so that a medium flowing inside it can be guided without leaks into a flow cavity lying inside the circumferential surface in the shaft step, for example into a hole. The fastening arrangement comprises a pipe with notches located in the end face, which lie upon the circumferential surface. A sleeve is installed on the inner side of the pipe, which sleeve has an axial width which covers the notches. The sleeve, moreover, is more flexible than the pipe and the pipe end, which is achieved by the thickness ratio of pipe to sleeve, by the notches, cutouts, and by the slots.

The invention claimed is:

1. A fastening arrangement for connecting two component parts, comprising:
    a pipe component having:
        a longitudinal axis and a circumference,
        a pipe end having a plurality of notches distributed over the circumference and an encompassing annular slot on an inner side of the pipe arranged in a region of the plurality of notches;
    a sleeve arranged on the pipe and within the annular slot that covers the plurality of notches; and
    a shaft step with a circumferential surface coaxial to the longitudinal axis of the pipe, wherein the inner side of the pipe end that faces the shaft step is arranged against the coaxial circumferential surface for connecting of the two component parts.

2. The fastening arrangement as claimed in claim 1, wherein the sleeve has a wall thickness corresponding to the depth of the annular slot.

3. The fastening arrangement as claimed in claim 2, wherein a bar arranged on an outer circumferential side of the sleeve engages one of the plurality of notches and extends in the circumferential direction and over an entire width of one of the plurality of notches.

4. The fastening arrangement as claimed in claim 3, wherein a bar engages in each of the plurality of notches and is located on the outer circumferential side of the sleeve.

5. The fastening arrangement as claimed in claim 4, wherein a plurality of radially orientated cutouts are provided in the sleeve.

6. The fastening arrangement as claimed in claim 5, wherein the sleeve has an end that faces the shaft step and includes slots that extend axially parallel and in each case terminate in one of the cutouts.

7. The fastening arrangement as claimed in claim 6, wherein the shaft step further comprises an end face side surface having an annular slot concentric to the longitudinal axis and a radially inner slot wall that forms a coaxial circumferential surface that locates the pipe.

8. The fastening arrangement as claimed in claim 7, wherein the pipe wall thickness is approximately three times greater than the sleeve wall thickness.

9. The fastening arrangement as claimed in claim 8, wherein the shaft step is formed by a rotor disk.

* * * * *